(12) United States Patent
Garg et al.

(10) Patent No.: US 6,968,016 B1
(45) Date of Patent: Nov. 22, 2005

(54) DEVICE AND METHOD FOR I/Q MODULATION, FREQUENCY TRANSLATION AND UPSAMPLING

(75) Inventors: Atul Garg, Sunnyvale, CA (US); Colin Nayler, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 861 days.

(21) Appl. No.: 09/814,590

(22) Filed: Mar. 22, 2001

(51) Int. Cl.[7] .............................................. H04L 27/36
(52) U.S. Cl. ..................................................... 375/298
(58) Field of Search ................................. 375/261, 279, 375/271, 295, 302, 296, 298, 284; 332/103, 332/151

(56) References Cited

U.S. PATENT DOCUMENTS

| | | | | |
|---|---|---|---|---|
| 5,621,761 A | * | 4/1997 | Heegard | 375/265 |
| 5,805,640 A | * | 9/1998 | O'Dea et al. | 375/296 |
| 5,978,420 A | * | 11/1999 | Koslov et al. | 375/295 |
| 6,236,283 B1 | * | 5/2001 | Koslov | 332/103 |
| 6,317,468 B1 | * | 11/2001 | Meyer | 375/269 |
| 6,535,073 B1 | * | 3/2003 | Garg et al. | 332/103 |
| 6,650,711 B1 | * | 11/2003 | Booth | 375/302 |

\* cited by examiner

*Primary Examiner*—Mohammed Ghayour
*Assistant Examiner*—Khanh Tran
(74) *Attorney, Agent, or Firm*—Renner, Otto, Boisselle & Sklar, LLP

(57) ABSTRACT

A device for modulating a carrier signal simultaneously performs frequency translation, upsampling, and pulse shaping. The device includes a mapper generating a first data signal. A complex mixer and an upsampling device are used to increase the data value frequency and spectrum shift the data signal. A finite impulse response filter operating on the data signal generates a digital signal representing the modulated carrier.

11 Claims, 2 Drawing Sheets

DEVICE AND METHOD FOR I/Q MODULATION, FREQUENCY TRANSLATION AND UPSAMPLING

TECHNICAL FIELD

The present invention relates generally to network interfacing, and more particularly, to a device and method for I/Q modulation, frequency translation, upsampling, and pulse shaping.

BACKGROUND OF THE INVENTION

The transmission of various types of digital data between computers continues to grow in importance. The predominant method of transmitting such digital data includes coding the digital data into a low frequency base data signal and modulating the base data signal onto a high frequency carrier signal. The high frequency carrier signal is then transmitted across a network cable medium, via RF signal, modulated illumination, or other network medium, to a remote network node.

At the remote computing station, the high frequency carrier signal must be received and demodulated to recover the original base data signal. In the absence of any distortion of the carrier signal across the network medium, the received carrier would be identical in phase, amplitude, and frequency to the transmitted carrier and could be demodulated using known mixing techniques to recover the base data signal. The base data signal could then be recovered into digital data using known sampling algorithms.

One problem with such networks is that the network topology tends to distort the high frequency carrier signal due to numerous branch connections and different lengths of such branches causing numerous reflections of the transmitted carrier. The high frequency carrier is further distorted by spurious noise caused by electrical devices operating in close proximity to the cable medium. Such problems are even more apparent in a network which uses home telephone wiring cables as the network cable medium because the numerous branches and connections are typically designed for transmission of plain old telephone system (POTS) signals in the 3–10 kilohertz frequency and are not designed for transmission of high frequency carrier signals on the order of 7 Megahertz. Further yet, the high frequency carrier signal is further distorted by turn-on transients due to on-hook and off-hook noise pulses of the POTS utilizing the network cables.

Such distortion of frequency, amplitude, and phase of the high frequency carrier signal degrades network performance and tends to impede the design of higher data rate networks. Known techniques for compensating for such distortion and improving the data rate of a network include complex modulation schemes.

Utilizing a complex modulation scheme such as quadrature amplitude modulation (QAM) data, both the amplitude and phase of the high frequency carrier are modulated to represent I and Q components of a base data signal. Referring to FIG. 1, a 4-QAM modulation constellation 10 is shown. In operation, each data symbol is represented by an I-value of +1 or −1 and a Q-value of +1 or −1 such that the data symbol can be represented by one of the four modulation states 12(*a*)–(*d*) in constellation 10. Each constellation state 12(*a*)–12(*d*) represents a unique combination of carrier amplitude and phase. For example, constellation state 12(*a*) represents a carrier amplitude of 14 and a carrier phase 16.

A complex modulation transmitter typically uses a look up table to generate an I-channel and a Q-channel baud rate data signal. An upsampler then inserts additional sample values of zero to increase the input sample frequency to a frequency greater than the desired carrier frequency. A complex mixer then mixes each of the I-channel signal and the Q-channel signal by digital sine waves and digital cosine waves of the carrier frequency as appropriate to generate a modulated carrier signal. Narrow band digital filters are then used to remove harmonics and to assure that the transmitted signal has a strong signal to noise ratio within the desired band without excessive noise in the side bands.

A problem with such systems is that a carrier frequency on the order of 7 MHz is typically represented by digital values clocked at a frequency on the order of 32 MHz. As such, a digital signal processor (DSP) implementation of a QAM (or I/Q) transmitter can consume many gates or may not even be possible to implement in a high speed DSP without architectural innovation. What is needed is a device and method for I/Q modulation, upsampling, and digital filtering that does not suffer the disadvantages of known systems.

SUMMARY OF THE INVENTION

A first aspect of the present invention is to provide a device for modulating a carrier signal which simultaneously performs frequency translation, upsampling, and pulse shaping. The device comprises: (a) a mapper generating a first data signal at a selected one of a plurality of baud rates; (b) a scaler multiplying the first data signal by one of a plurality of predetermined scaler values selected to correspond to the baud rate to generate a scaled data signal; (c) a complex mixer for generating a frequency shifting scaled data signal; (d) an upsampler circuit for increasing the sampling frequency of the frequency shifted scaled data signal; and (e) a pulse shaper circuit for generating a digital representation of a modulated carrier signal in accordance with the frequency shifted scaled data signal.

The first data signal may comprise an I-channel first data signal and a Q-channel first data signal. Similarly, the scaled data signal may comprise an I-channel scaled data signal and a Q-channel scaled data signal, and the frequency shifted scaled data signal may comprise and I-channel frequency shifted scaled data signal and a Q-channel frequency shifted scaled data signal.

The first data signal may be a digital data signal with a sampling frequency corresponding to the highest of the plurality of baud rates and each of the predetermined scaler values is a value which provides for the scaled data signal to have approximately the same signal strength independent of baud rate. In the exemplary embodiment, the plurality of baud rates includes 2 Mbaud and 4 Mbaud, the sampling rate is 4 MHz, and the predetermined scaler values are a value of 1 corresponding to the 2 Mbaud baud rate and a value of ⅔ corresponding to the 4 Mbaud baud rate.

The complex mixer may include a first and a second multiplier each multiplying the I-channel scaled data signal by a sine waveform and a cosine waveform respectively, and a third and fourth multiplier each multiplying the Q-channel scaled data signal by the sine waveform and a cosine waveform respectively. A first summer adds the result of the second multiplier to the result of the third multiplier, multiplied by negative one, to generate the I-channel frequency shifted scaled data signal and a second channel summer adds the result of the first multiplier and the result of the fourth multiplier to generate the Q-channel frequency shifted scaled data signal. In the exemplary embodiment, the sine waveform and the cosine waveform each have a frequency of one fourth the sampling frequency.

The pulse shaper circuit may include a finite impulse response filter and a coefficient matrix storing a set of coefficients for each of the I-channel and the Q-channel. The finite impulse response filter may include 16-tap finite impulse filter and each set of filter coefficients includes nine non-zero coefficients with each coefficient being a 10-bit coefficient.

A second aspect of the present invention is to provide a method for modulating a carrier signal. The method comprises: (a) generating a first data signal at a selected one of a plurality of baud rates; (b) scaling the first data signal by one of a plurality of predetermined scaler values selected to correspond to the baud rate to generate a scaled data signal; (c) mixing the scaled data signal with a frequency signal to generate a frequency shifted scaled data signal; (d) increasing the sampling frequency of the frequency shifted scaled data signal; and (e) filtering the frequency shifted scaled data signal to generate a digital representation of a modulated carrier signal.

The step of generating the first data signal may comprise generating both an I-channel first data signal and a Q-channel first data signal. Similarly, the step of scaling the first data signal may comprise scaling the I-channel first data signal and the Q-channel first data signal and the step of mixing the scaled data signal may include complex mixing of both the I-channel scaled data signal and the Q-channel scaled data signal.

The first data signal may be a digital data signal with a sampling frequency corresponding to the highest of the plurality of baud rates and each of the predetermined scaler values is a value which provides for the scaled data signal to have approximately the same signal strength independent of baud rate. In the exemplary embodiment, the plurality of baud rates includes 2 Mbaud and 4 Mbaud, the sampling rate is 4 MHz, and the predetermined scaler values are a value of 1 corresponding to the 2 Mbaud baud rate and a value of ⅔ corresponding to the 4 Mbaud baud rate.

The step of complex mixing the scaled data signal may include: (i) subtracting the result of the Q-channel scaled data signal multiplied by a sine waveform from the result of the I-channel scaled data signal multiplied by a cosine waveform to generate an I-channel frequency shifted data signal; and (ii) adding the result of the Q-channel scaled data signal multiplied by a cosine waveform from the result of the I-channel scaled data signal multiplied by a sine waveform to generate a Q-channel frequency shifted data signal. In the exemplary embodiment, the sine waveform and the cosine waveform each have a frequency of one fourth the sampling frequency.

The step of filtering the frequency shifted scaled data signal may include 16-tap finite impulse response filtering utilizing a set of predetermined filter coefficients for each of the I-channel and the Q-channel. Each set of filter coefficients includes nine non-zero coefficients with each coefficient being a 10-bit coefficient.

DESCRIPTION OF THE PREFERRED EMBODIMENTS

Figure 1:
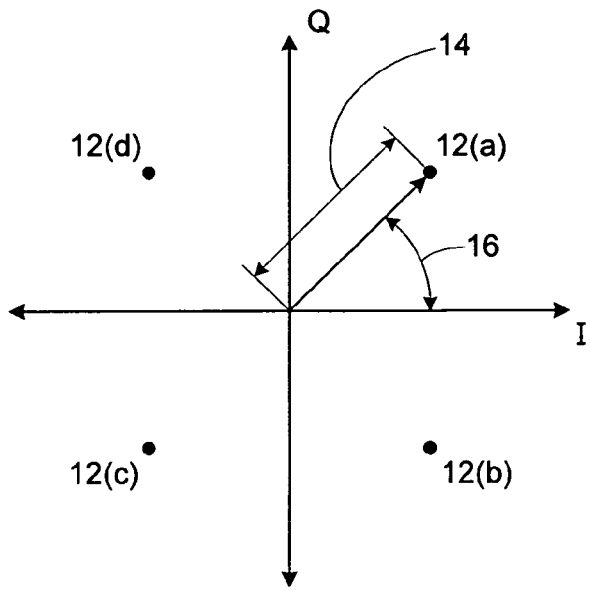
FIG. 1 is a diagram of a complex modulation constellation useful in the practice of the present invention.

The present invention will now be described in detail with reference to the drawings. In the drawings, like reference numerals are used to refer to like elements throughout.

Figure 2:
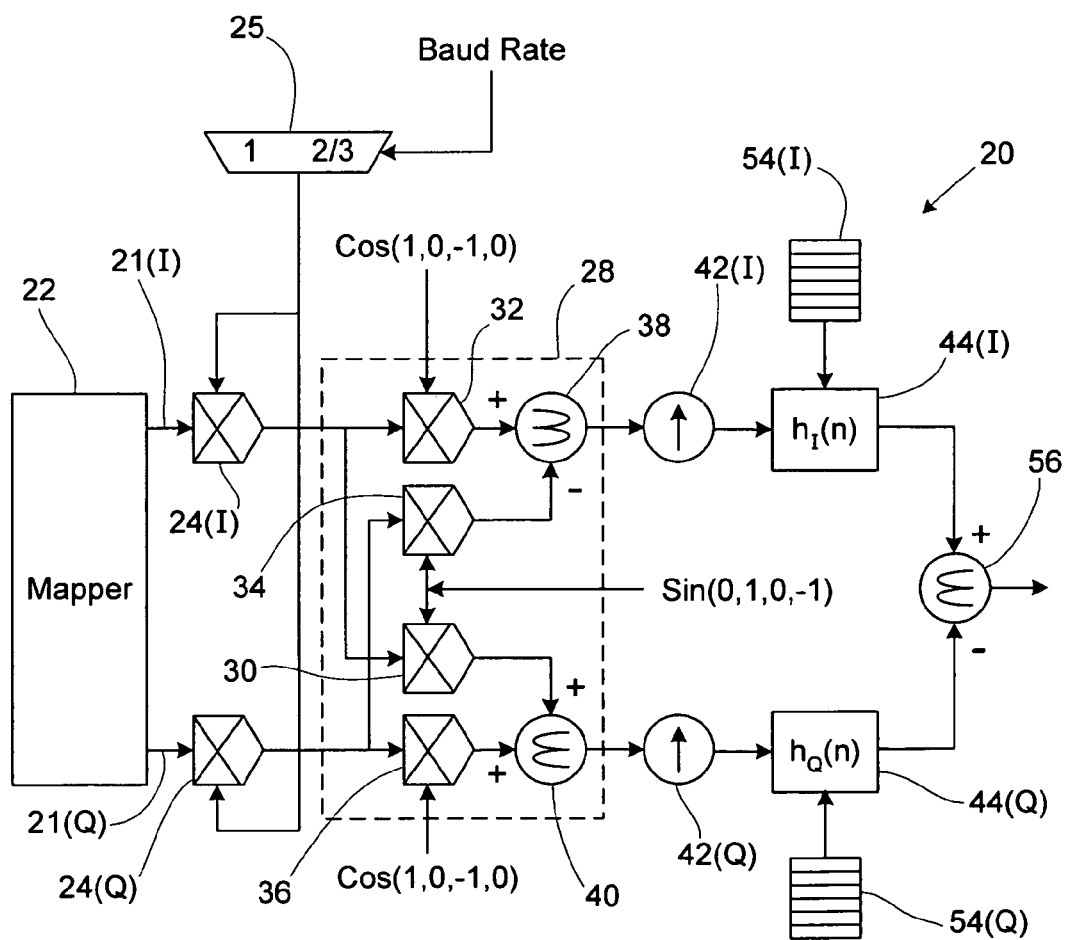
FIG. 2 is a block diagram of a I/Q modulation circuit in accordance with this invention.

Referring to FIG. 2, a first embodiment of a transmitter circuit 20 for I/Q modulation, frequency translation, and pulse shaping is shown. Transmitter circuit 20 includes mapper 22 which will typically include a look up table for generating each of an I-channel baud rate data signal 21(I) and a Q-channel baud rate data signal 21(Q) using techniques known in the art. In the exemplary embodiment, each data signal is a 7-bit value and the data is either at a 2 MHz or 4 MHz baud rate. However, both the 2 Mbaud and the 4 Mbaud data are represented by a data signal comprising a series of data values clocked at 4 MHz, every other data value being a zero for the 2 Mbaud data. The I-channel data signal and the Q-channel data signal are each input to a pre-scaler 24(I) and 24(Q) respectively. Prescaler 24(I) multiples the I-channel data signal by a scaler value from a multiplexer 25 and similarly, prescaler 24(Q) multiplies the Q-channel data signal by a scaler value from the multiplexer 25. The multiplexer 25 selects between scaler values of 1 and ⅔ based on an input baud rate signal. When the baud rate is 2 MHz the selected scaler value is 1 and when the baud rate is 4 MHz, the selected scaler value is ⅔. The purpose of scaling the I-channel data signal and the Q-channel data signal is to assure that the total signal strength remains within the required range independent of the baud rate.

The outputs of the pre-scalers 24(I) and 24(Q) are input to a complex mixer 28. The complex mixer 28 includes a first multiplier 30 and a second multiplier 32 each multiplying the I-channel data signal by a 1 MHz sine waveform and a 1 MHz cosine waveform respectively. A third multiplier 34 and a fourth multiplier 36 each multiply the Q-channel data signal by the 1 MHz sine waveform and a 1 MHz cosine waveform respectively. An I-channel summer 38 subtracts the result of the third multiplier 34 from the result of the second multiplier 32 and a Q-channel summer 40 adds the result of first multiplier 30 and the result of the fourth multiplier 36. The 1 MHz sine waveform and the 1 MHz cosine waveform each have a frequency of one fourth the frequency of the data samples such that such that its digital representation consist entirely of the values of 1, 0, and −1 and thus multiplication hardware can be greatly simplified.

The I-channel output and the Q-channel output of the complex mixer 28 are input to each of each of an I-channel upsampler 42(I) and a Q-channel upsampler 42(Q) respectively which function to increase the sampling rate from 4 MHz to 32 MHz by inserting sample values of zero at a 32 MHz rate between the 4 MHz sample values.

The 32 MHz samples of each of the I-channel signal and the Q-channel signal are input to each of an I-channel pulse shaper 44(I) and a Q-channel pulse shaper 44(Q) respectively (collectively referred to as pulse shapers 44). Pulse shapers 44 are 16-tap finite impulse response (FIR) digital filters.

Figure 3:
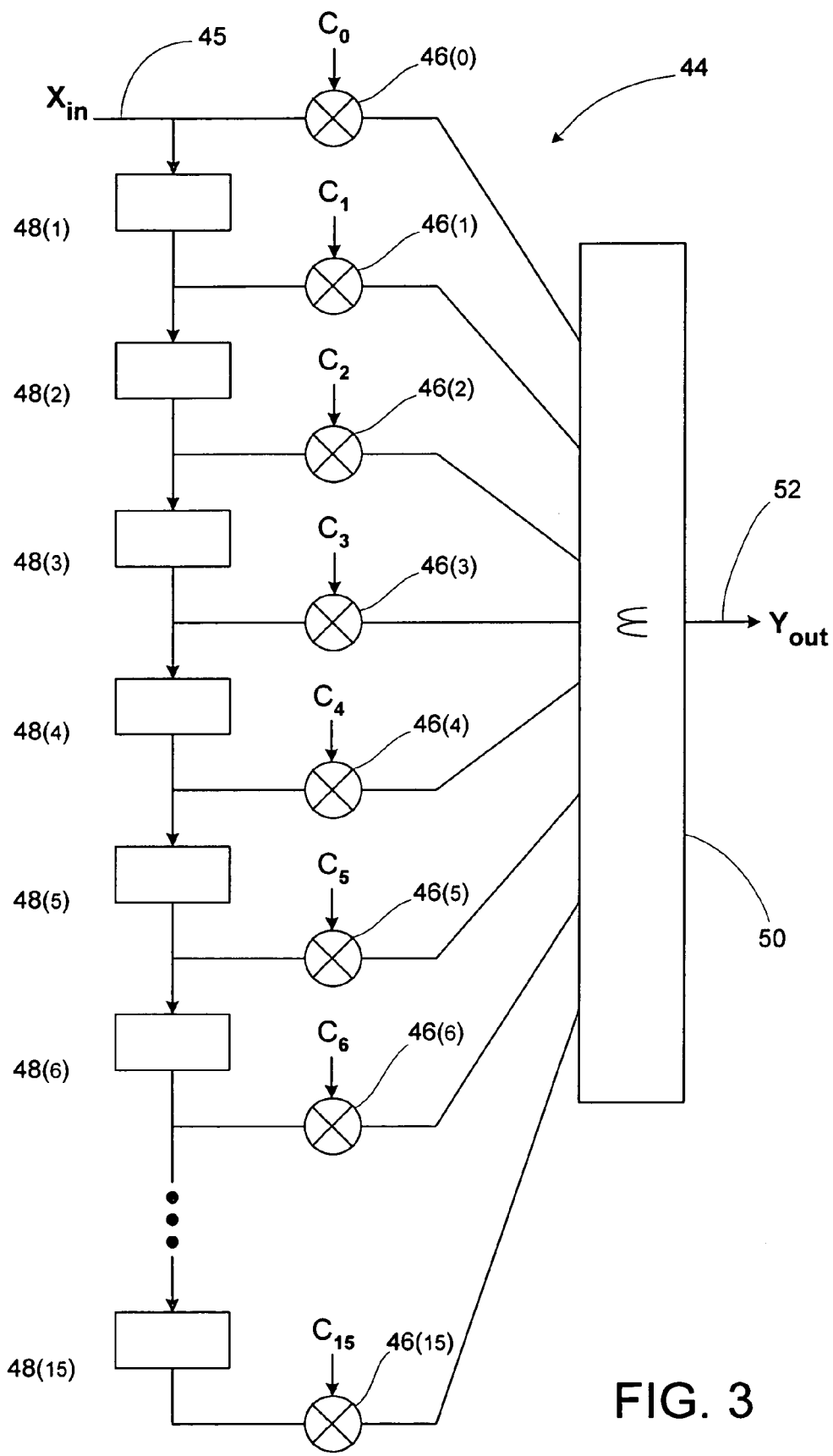
FIG. 3 is a block diagram of a digital filter useful in implementing an embodiment of this invention.

Referring briefly to FIG. 3, a 16-tap FIR filter 44 is shown in more detail. Input port 45 of filter 44 receives each sequential sample value. In a first clock cycle, a first sample value is input to each of multiplier 46(0), operating to multiply the first sample value by a coefficient C(0), and a delay register 48(1) which operates to store the first sample value for one clock cycle. At a second clock cycle, immediately following the first clock cycle, the first sample value is released from delay register 48(1) and input to multiplier 46(1) where it is multiplied by a second coefficient C(1). Simultaneously, the first sample value is also input to a second delay register 48(2) wherein it will be stored before being input to a third multiplier 46(2) in a third clock cycle and to subsequent delay registers 48(3) to 48(15) and subsequent multipliers 46(3) to 46(15) in subsequent clock cycles in a similar manner.

Simultaneously at the second clock cycle, a second sample value at input port 45 is input to the first delay register 48(1). At each clock cycle, the results from each multiplier 46(0) to 46(15) are input to summer 50 which adds such results and generates output signal on line 52 which is a series of filtered sample values occurring at the 32 MHz sampling frequency.

In the exemplary embodiment, the value for each of the 16 coefficients C(0) through C(15) is as set forth in the following table:

| Coefficient | Value  |
|-------------|--------|
| 0           | −0.011 |
| 1           | 0.000  |
| 2           | 0.062  |
| 3           | 0.000  |
| 4           | −0.219 |
| 5           | 0.000  |
| 6           | 0.924  |
| 7           | 1.513  |
| 8           | 0.924  |
| 9           | 0.000  |
| 10          | −0.219 |
| 11          | 0.000  |
| 12          | 0.062  |
| 13          | 0.000  |
| 14          | −0.011 |
| 15          | 0.000  |

It should be appreciated that the pulse shaper 44 comprising the 16-tap FIR filter only needs to include nine multipliers as only nine of the sixteen coefficients is non-zero. Further, referring again to FIG. 2, it should be appreciated that a characteristic of both the 32 MHz I-channel signal and the 32 MHz Q-channel signal from the complex mixer 28 is that each data value is followed by seven values of zero which are inserted by the upsampler 42(I) and 42(Q). As such, there is a maximum of only two non-zero samples that can reside in a 16-TAP filter at any particular time and therefore the pulse shaper 44 can be implemented with only two multipliers rather than the typical 16 multipliers.

The coefficients for pulse shapers 44(I) and 44(Q) are stored in two coefficient matrixes 54(I) and 54(Q). Each coefficient matrix 54(I) and 54(Q) is a 9×10 matrix which stores a single set of non-zero coefficients. Each set contains nine non-zero coefficients and each coefficient is 10 bits wide.

A summer 56 operates to subtract the result of pulse shaper 44(Q) from the result of pulse shaper 44(I) resulting in a sequence of sample values representing the I/Q amplitude modulated carrier signal. Such sequence of samples is then converted to an analog carrier signal and transmitted over a transmission medium using digital to analog techniques known to those skilled in the art.

It should be appreciated that the device and methods of this invention provide for I/Q modulation, frequency translation, upsampling, and pulse shaping requiring a significantly lower gate count resulting in significantly less complex DSP hardware than known systems. Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A device for modulating a carrier signal comprising:
   (a) a mapper generating a first data signal at a selected one of a plurality of baud rates, the first data signal comprises an I-channel first data signal and a Q-channel first data signal;
   (b) a scaler multiplying the first data signal by one of a plurality of predetermined scaler values selected to correspond to the baud rate to generate a scaled data signal, the scaled data signal comprises an I-channel scaled data signal and a Q-channel scaled data signal and wherein the complex mixer includes:
      (i) a first multiplier and a second multiplier each multiplying the I-channel scaled data signal by a sine waveform and a cosine waveform respectively;
      (ii) a third and fourth multiplier each multiplying the Q-channel scaled data signal by the sine waveform and a cosine waveform respectively;
      (iii) a first summer adding the result of the second multiplier to the result of the third multiplier multiplied by negative one to generate the I-channel frequency shifted scaled data signal; and
      (iv) a second channel summer adding the result of the first multiplier and the result of the fourth multiplier to generate the Q-channel frequency shifted scaled data signal;
   (c) a complex mixer for generating a frequency shifting scaled data signal, the frequency shifted scaled data signal comprises an I-channel frequency shifted scaled data signal and a Q-channel frequency shifted scaled data signal;
   (d) an upsampler circuit for increasing the sampling frequency of the frequency shifted scaled data signal; and
   (e) a pulse shaper circuit for generating a digital representation of a modulated carrier signal in accordance with the frequency shifted scaled data signal, wherein the pulse shaper circuit includes a finite impulse response filter and a coefficient matrix storing a set of coefficients for each of the I-channel and the Q-channel.

2. The device for modulating a carrier signal of claim 1, wherein the first data signal is a digital data signal with a sampling frequency corresponding to the highest of the plurality of baud rates.

3. The device for modulating a carrier signal of claim 2, wherein each of the predetermined scaler values is a value which provides for the scaled data signal to have approximately the same signal strength independent of baud rate.

4. The device for modulating a carrier signal of claim 1, wherein the sine waveform and the cosine waveform each have a frequency of one fourth the sampling frequency.

5. The device for modulating a carrier signal of claim 2, wherein the plurality of baud rates are 2 Mbaud and 4 Mbaud and the sampling frequency is 4 MHz.

6. The device for modulating a carrier signal of claim 5, wherein the predetermined scaler values are a value of 1 corresponding to the 2 Mbaud rate and a value of ⅔ corresponding to the 4 Mbaud rate.

7. A device for modulating a carrier signal comprising:
(a) a mapper generating first data signal at a selected one of a plurality of baud rates;
(b) a scaler multiplying the first data signal by one of a plurality of predetermined scaler values selected to correspond to the baud rate to generate a scaled data signal;
(c) a complex mixer for generating a frequency shifting scaled data signal;
(d) an upsampler circuit for increasing the sampling frequency of the frequency shifted scaled data signal; and
(e) a pulse shaper circuit for generating a digital representation of a modulated carrier signal in accordance with the frequency shifted scaled data signal, wherein the pulse shaper circuit includes a finite impulse response filter and a coefficient matrix storing a set of coefficients for each of the I-channel and the Q-channel;
wherein the finite impulse response filter is a 16 tap finite impulse filter and each set of filter coefficients includes 9 non-zero coefficients, each coefficient being a 10 bit coefficient.

8. A method for modulating a carrier signal, the method comprising:
(a) generating a first data signal at a selected one of a plurality of baud rates, including generating an I-channel first data signal and a Q-channel first data signal;
(b) scaling the first data signal by one of a plurality of predetermined scaler values selected to correspond to the baud rate to generate a scaled data signal, including scaling the I-channel first data signal and the Q-channel first data signal;
(c) mixing the scaled data signal with a frequency signal to generate a frequency shifted scaled data signal, including complex mixing of both the I-channel scaled data signal and the Q-channel scaled data signal;
(d) increasing the sampling frequency of the frequency shifted scaled data signal; and
(e) filtering the frequency shifted scaled data signal to generate a digital representation of a modulated carrier signal, wherein filtering the frequency shifted scaled data signal includes finite impulse response filtering utilizing a set of predetermined filter coefficients for each of the I-channel and the Q-channel; wherein:
the first data signal is a digital data signal with a sampling frequency corresponding to the highest of the plurality of baud rates,
each of the predetermined scaler values is a value which provides for the scaled data signal to have approximately the same signal strength independent of baud rate, and
the step of complex mixing the scaled data signal includes:
(i) subtracting the result of the Q-channel scaled data signal multiplied by a sine waveform from the result of the I-channel scaled data signal multiplied by a cosine waveform to generate an I-channel frequency shifted data signal; and
(ii) adding the result of the Q-channel scaled data signal multiplied by a cosine waveform from the result of the I-channel scaled data signal multiplied by a sine waveform to generate a Q-channel frequency shifted data signal.

9. The method for modulating a carrier signal of claim 8, wherein the sine waveform and the cosine waveform each have a frequency of one fourth the sampling frequency.

10. The method for modulating a carrier signal of claim 8, wherein the plurality of baud rates are 2 Mbaud and 4 Mbaud and the sampling frequency is 4 MHz, and the predetermined scaler values are a value of 1 corresponding to the 2 Mbaud rate and a value of ⅔ corresponding to the 4 Mbaud rate.

11. A method for modulating a carrier signal, the method comprising:
(a) generating a first data signal at a selected one of a plurality of baud rates;
(b) scaling the first data signal by one of a plurality of predetermined scaler values selected to correspond to the baud rate to generate a scaled data signal;
(c) mixing the scaled data signal with a frequency signal to generate a frequency shifted scaled data signal;
(d) increasing the sampling frequency of the frequency shifted scaled data signal; and
(e) filtering the frequency shifted scaled data signal to generate a digital representation of a modulated carrier signal, wherein filtering the frequency shifted scaled data signal includes finite impulse response filtering utilizing a set of predetermined filter coefficients for each of the I-channel and the Q-channel, wherein:
the finite impulse response filtering is 16 tap filtering and each set of filter coefficients includes 9 non-zero coefficients, each coefficient being a 10 bit coefficient.

* * * * *